United States Patent
Boyd (10) Patent No.: US 7,190,271 B2
(45) Date of Patent: Mar. 13, 2007

(54) LOCATION SYSTEM AND METHOD THAT ACHIEVES TIME SYNCHRONIZED NETWORK PERFORMANCE USING UNSYNCHRONIZED RECEIVER CLOCKS

(75) Inventor: Robert W. Boyd, Eidson, TN (US)

(73) Assignee: Wherenet Corp, Santa Clara, CA (US)

( * ) Notice: Subject to any disclaimer, the term of this patent is extended or adjusted under 35 U.S.C. 154(b) by 321 days.

(21) Appl. No.: 10/980,855

(22) Filed: Nov. 3, 2004

(65) Prior Publication Data

US 2005/0280578 A1 Dec. 22, 2005

Related U.S. Application Data

(60) Provisional application No. 60/518,178, filed on Nov. 7, 2003.

(51) Int. Cl.
*G08B 13/14* (2006.01)
(52) U.S. Cl. .................. 340/572.4; 340/572.1; 340/572.2; 340/539.13
(58) Field of Classification Search ............. 340/572.1, 340/572.2, 572.3, 572.4, 539.11, 539.13, 340/539.15, 10.1, 10.3; 342/450, 451, 463; 375/130
See application file for complete search history.

(56) References Cited

U.S. PATENT DOCUMENTS

| | | | |
|---|---|---|---|
| 5,056,106 A * | 10/1991 | Wang et al. ............. 375/130 |
| 5,920,287 A | 7/1999 | Belcher et al. ............. 342/450 |
| 5,995,046 A | 11/1999 | Belcher et al. ............. 342/450 |
| 6,121,926 A | 9/2000 | Belcher et al. ............. 342/450 |
| 6,127,976 A | 10/2000 | Boyd et al. ................. 342/463 |
| 6,170,748 B1 | 1/2001 | Hash et al. ................. 235/451 |
| 6,249,252 B1 * | 6/2001 | Dupray ...................... 342/450 |
| 6,268,723 B1 | 7/2001 | Hash et al. ................. 324/243 |
| 6,281,834 B1 | 8/2001 | Stilp .......................... 342/174 |
| 6,366,242 B1 | 4/2002 | Boyd et al. ................. 342/450 |
| 6,366,626 B1 | 4/2002 | Boyd ......................... 375/343 |
| 6,380,894 B1 | 4/2002 | Boyd et al. ................. 342/450 |
| 6,393,045 B1 | 5/2002 | Belcher et al. ............. 375/130 |
| 6,655,582 B2 | 12/2003 | Wohl et al. ................. 235/380 |
| 6,859,485 B2 * | 2/2005 | Belcher ..................... 375/130 |
| 7,126,535 B2 * | 10/2006 | Jenkins et al. ............. 342/463 |
| 2001/0030625 A1 | 10/2001 | Doles et al. ................ 342/387 |
| 2002/0118655 A1 | 8/2002 | Harrington et al. ......... 370/328 |
| 2002/0181565 A1 | 12/2002 | Boyd et al. ................. 375/152 |

FOREIGN PATENT DOCUMENTS

| EP | 1 263 255 | 12/2002 |
|---|---|---|
| WO | 03/075630 | 9/2003 |

* cited by examiner

*Primary Examiner*—Van T. Trieu
(74) *Attorney, Agent, or Firm*—Allen, Dyer, Doppelt, Milbrath & Gilchrist, P.A.

(57) ABSTRACT

A system for locating an object within a monitored environment includes a tag transmitter that transmits an RF signal to receivers having unsynchronized clocks. A processor is operative with each receiver and determines clock timing relationships for the clocks based on one of at least propagation or processing delays in the receivers to synchronize receiver performance.

52 Claims, 6 Drawing Sheets

LOCATION SYSTEM AND METHOD THAT ACHIEVES TIME SYNCHRONIZED NETWORK PERFORMANCE USING UNSYNCHRONIZED RECEIVER CLOCKS

RELATED APPLICATION

This application is based upon prior filed copending provisional application Ser. No. 60/518,178 filed Nov. 7, 2003.

FIELD OF THE INVENTION

This invention relates to the field of real-time object location and tracking systems, and more particularly, this invention relates to achieving time synchronized network performance in an object location tracking system or similar network using unsynchronized receiver clocks.

BACKGROUND OF THE INVENTION

In commonly assigned U.S. Pat. Nos. 5,920,287; 5,995,046; 6,121,926; and 6,127,976, and published patent application Ser. Nos. 2001/0030625, 2002/0118655, and 2002/0181565, the disclosures which are hereby incorporated by reference in their entirety, a real time location system is disclosed using a plurality of tag emission (signal) readers that are disbursed throughout a monitored environment, such as a manufacturing environment. The tag signal readers are operative with a location processor to determine which tag signals transmitted from tag transmitters are first-to-arrive signals. The location processor conducts differentiation of the first-to-arrive signals to locate a tag within the monitored environment.

These location and tracking systems provide asset management that not only addresses the need to locate and track different components in the course of their travel through a manufacturing and assembly sequence, but also addresses the more general problem concerning component and equipment inventory control and allow control concerning the whereabouts of any and all assets of a business, factory, educational, military, or recreational facility. In some systems, status information can be provided to a tag transmitter by means of sensors associated with the tag. Typically, the tag signal readers are placed at known locations throughout the environment having the objects to be located or tracked. The system uses time-of-arrival differentiation of repetitive spread spectrum, short duration pulse "blinks" from object-attached tags. The system provides the practical, continuous identification of the location of each and every object within the environment of interest, irrespective of whether the object is stationary or moving.

Much of the disclosure in these incorporated by reference patents and published patent applications rely on differential time-of-arrival (TOA) applications that receive a transmitted signal at multiple physical locations corresponding to the receiver to spatially locate the tag transmitter. Normally, the clocks at each receiver are synchronized so that differences in the indicated time-of-arrival closely approximate the actual time-of-arrival difference. In order to establish this system, each receiver is operative as a network node and must understand and adjust to a synchronization signal. Those disclosures, however, do not adequately describe techniques to determine differences in signal arrival times, for example, if the receivers are unsynchronized.

SUMMARY OF THE INVENTION

In view of the foregoing background, it is therefore an object of the present invention to provide a real time location system that is operative for locating an object associated with the tag transmitter even when receivers as network nodes have unsynchronized clocks.

It is yet another object of the present invention to provide a system and method that achieves time synchronized network performance using unsynchronized network nodes, for example, receiver clocks.

In accordance with the present invention, a system locates an object within a monitored environment. A tag transmitter is associated with an object to be located. A tag transmitter transmits an RF signal, which is received at a plurality of receivers within the monitored environment. The receivers have unsynchronized clocks. A processor is operative with each receiver and determines clock timing relationships for the clocks based on one of at least propagation or processing delays in the receivers to reflect what would have resulted if the clocks at each receiver had been synchronized. Differentiation of the time arrival signals is conducted to locate the object associated with the tag transmitter. The processor that determines clock timing indications could be separate from any processor that conducts differentiation of the time-of-arrival signals or could be the same processor.

In one aspect of the present invention, the tag transmitter is positioned at a fixed location. A pair of tag transmitters can transmit RF signals to receivers with known propagation delay. The processing delay within each receiver could be substantially constant with each other and the processor could be operative for processing two time separated signals for determining a differential clock rate. The processor could also be operative for processing three time separated signals to indicate differential rate change and to maintain a model of timing relationships of clocks at the receivers.

In yet another aspect of the present invention, the receivers can be positioned at known locations. The RF signal could include data identifying an object associated with the tag transmitter. The RF signal could be formed as a pseudo-random spread spectrum RF signal. The processor could also be operative to process first to arrive RF signals at each receiver and be operative for forming a tracking loop to track clock relationships that occur naturally over time. The processor could also determine an equation relating the indicated time of one clock at a respective receiver to another clock at another receiver and tracking changes in that relationship over time.

A system for time synchronizing a network includes a tag transmitter positioned at a known location that transmits an RF signal. A plurality of receivers receive the RF signal from the tag transmitter, each receiver having an unsynchronized clock with the other receivers. A processor is operative with each receiver for receiving time-of-arrival signals from the receivers and determining clock timing indications for each clock at a receiver based on one of at least a propagation or processing delays in the receivers to adjust an indicated arrival time of RF signals at each receiver to reflect what would have resulted if the clocks at each receiver had been synchronized.

A method of the invention is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention provides a time-synchronized system that can, in one aspect of the invention, use receivers as nodes having clocks that are unsynchronized, but still provide for synchronization and tagged object location. This invention, in one aspect, is particularly useful in differential time-of-arrival (TOA) applications, such as disclosed in the above-identified and incorporated by reference patents and published patent applications. A differential time-of-arrival location system receives a transmitted signal at multiple physical locations in order to locate the tag transmitter and associated object. Normally, clocks at each receiver are synchronized so that differences in the indicated TOA closely approximate the actual TOA difference. In order to do so, each receiver must understand and adjust to some special synchronization signal. The system and method of the present invention accurately determines the differences in signal arrival times without requiring the receivers to recognize or adjust to any special signal, i.e., network synchronization.

Figure 1:
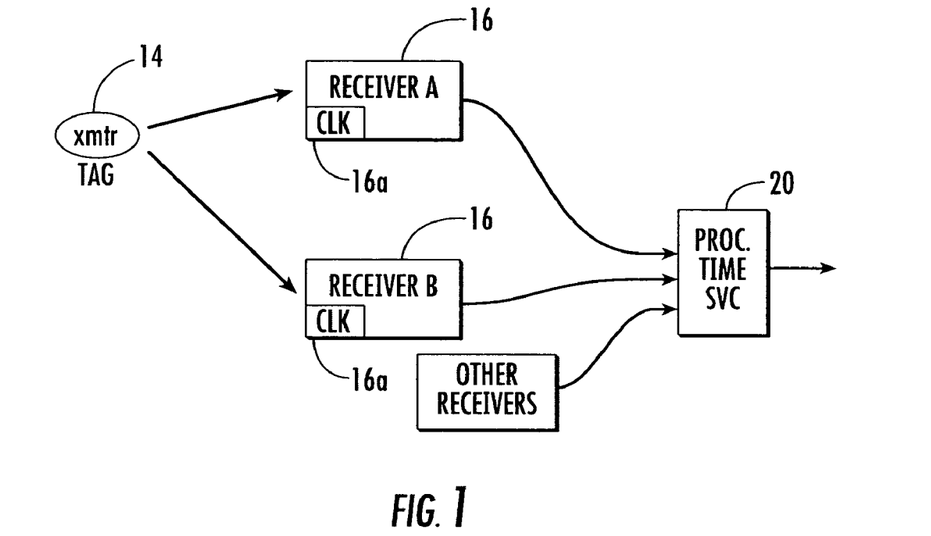
FIG. 1 is a block diagram showing unsynchronized receivers that receive an RF signal from a tag transmitter and forward information to a processor operative as a time service in accordance with the present invention.
Figure 1A:
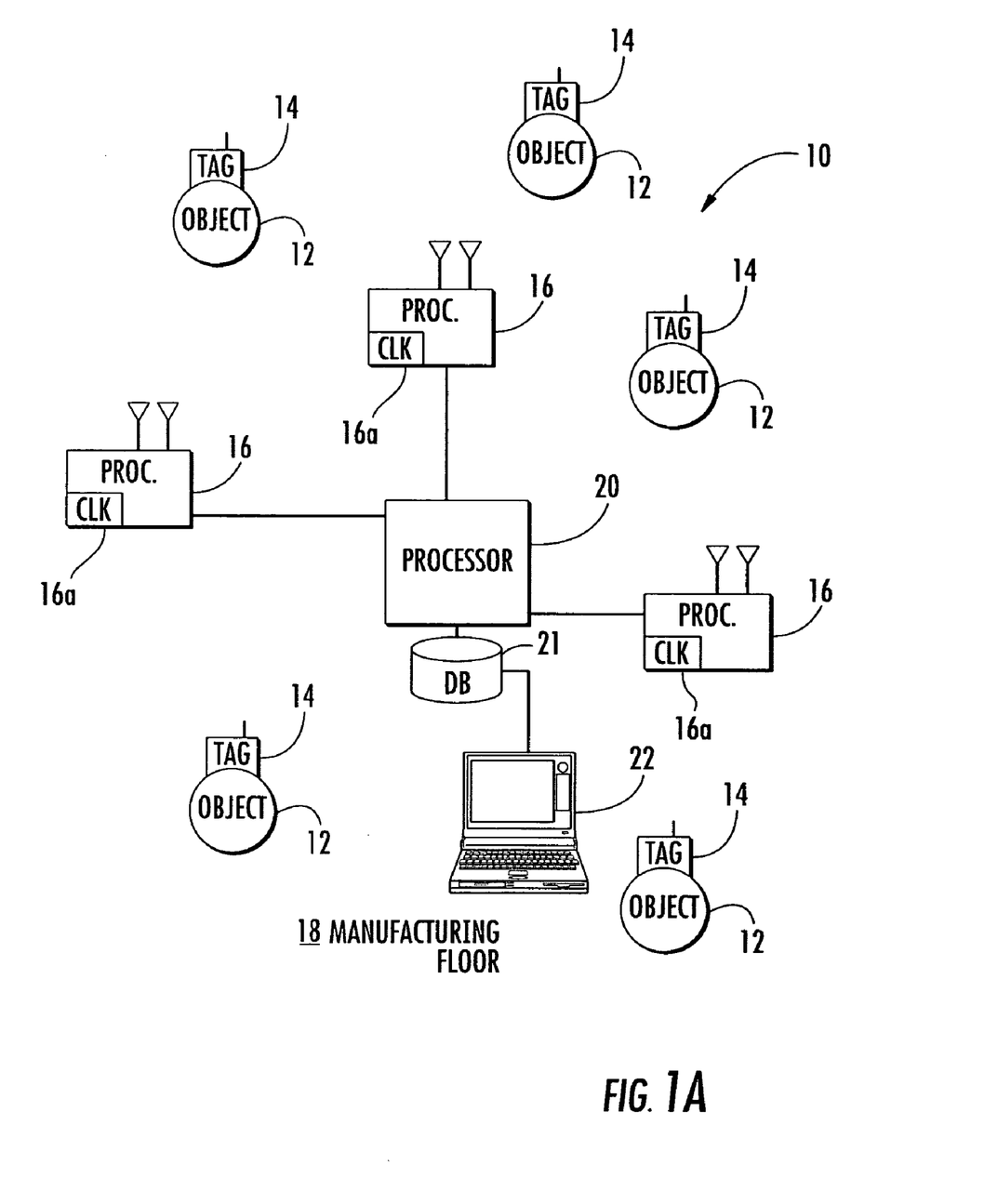
FIG. 1A is a block diagram showing the general architecture of a tagged object tracking and location system.

For purposes of description, a location system operative with the present invention will be described with reference to FIG. 1A, followed by a detailed explanation of the invention. As shown in one non-limiting example of FIG. 1A, a location system 10 includes a number of objects 12 having wireless tag transmitters 14 associated therewith. A number of signal readers 16 as receivers are contained within the monitored environment 18, for example, a manufacturing floor, and act as tag signal readers (receivers) for receiving signals from the wireless tag transmitters 14. Each signal reader 16 of a receiver includes a receiver clock 16a, which can be unsynchronized in some cases.

In one aspect of the present invention, the tag signal readers 16 could be associated with an access point base station of a wireless local area network transmission. The signals transmitted by the wireless tag transmitters 14 are wideband, spread spectrum signals and, in one aspect, a timing marker could be appended a predetermined time in front of the wideband, spread spectrum signal for indicating the presence of the wideband, spread spectrum signal. A location processor 20, which could be operative as the time service of the invention, is operatively coupled to the tag signal readers such as by a wireless communication system or a wired connection, for detecting the timing markers of signals. Whether a timing marker is used or not, the processor correlates a signal as a first-to-arrive signal and conducts differentiation of first-to-arrive signals to locate a wireless transmitter. If a timing marker is used, it could be timed about 80 to about 120 nanoseconds in front of the wideband, spread spectrum signal.

Much of the technology and detection capability as associated with the system and method of the present invention can use circuitry and algorithms described in the commonly assigned and incorporated by reference patents and published patent applications listed above. The circuitry described in these references can be modified for use with system and method for achieving time synchronized network performance even when receiver clocks are unsynchronized.

A database 21 could be accessible by a personal computer 22 or other workstation, and be used for providing data updates, control over the system or viewing the operation of the system. For example, the computer workstation tool as disclosed in the incorporated by reference U.S. Pat. No. 6,366,242 patent could be used.

Although operation of tag transmitters can vary depending on the type of circuitry chosen by those skilled in the art, in one aspect of the invention, a tag transmitter transmits wideband (spread spectrum) pulse of radio frequency energy that is encoded with information, such as that representative of the identification of the object, and other object-associated information stored in a memory. A timing marker could precede the pulse as a preamble.

Each tag transmitter 14 can have a unique internal identification number that is transmitted via radio frequency and could also be read with a bar code scanner, if necessary. This could allow seamless integration of a bar code system with a location system. The tag transmitter could include a memory having a read/write memory that acts as a portable data file to carry data between various environments and provide a field accessible, distributed database. The frequency range can vary, but as one non-limiting example, it could be about 2.4 to about 2.483 GHz. The typical read range can range from about 350 feet to greater than 1,000 feet in some instances, and even greater depending on the type of system and transmitter.

The tag signal readers or receivers 16 can be operative as network nodes, and include an active receiver and antenna array in some examples that capture spread spectrum radio signals from the tag transmitters. They are typically installed in a grid pattern to provide complete coverage to a site. They can be mounted from as little as 250 feet apart to as much as 750 feet apart and even greater distances.

Although mutually diverse antenna are illustrated, it is also possible that an omnidirectional, circularly polarized antenna could be used as noted in some of the aforementioned and incorporated by reference patents and published patent applications. This would allow a tag signal reader to receive signals from any direction and provide hemispherical coverage within an environment to maximize response to the horizon and diminish response by several decibels to signals arriving from a vertical (downward) direction, which could be advantageous in some cases. The use of mutually diverse antennas, on the other hand, obviates some multipath based fades and nulls. It is also possible to incorporate configuration and/or sensitivity diversity into the antennas, such as by using orthogonally polarized antennas.

The system and method of the present invention determines the relationship between unsynchronized receivers 16 by having the receivers observe the same radio frequency (RF) signal. There may be nothing special about this RF signal or it could include a unique characteristic, for example, sent from a known location. In either case, the receivers 16 would not have to perform special processing for this RF signal.

Each receiver 16 determines the signal's time of reception noting its own clock 16a and sends its clock information to the central processor 20, which is also operative as a "time service" of the invention. These signals can be sent by any convenient means, i.e., over a wired or wireless Local Area Network (LAN).

In this example, clocks 16a in each receiver 16 are free running, i.e., completely unsynchronized. The processor 20 is operative as a time service and discovers relationships between these clocks 16a and adjusts indicated arrival times appropriately, creating the illusion of time-synchronized receivers 16. Using these common observations, the processor 20 learns how to relate the times indicated by each receiver clock to every other receiver's clock.

Consequently, rather than synchronizing each receiver 16, the processor adjusts the indicated TOA's to reflect what would have resulted if the clocks 16a had been synchronized. These adjustments are reevaluated as often as necessary to preserve the required accuracy of the time relationships.

Figure 2:
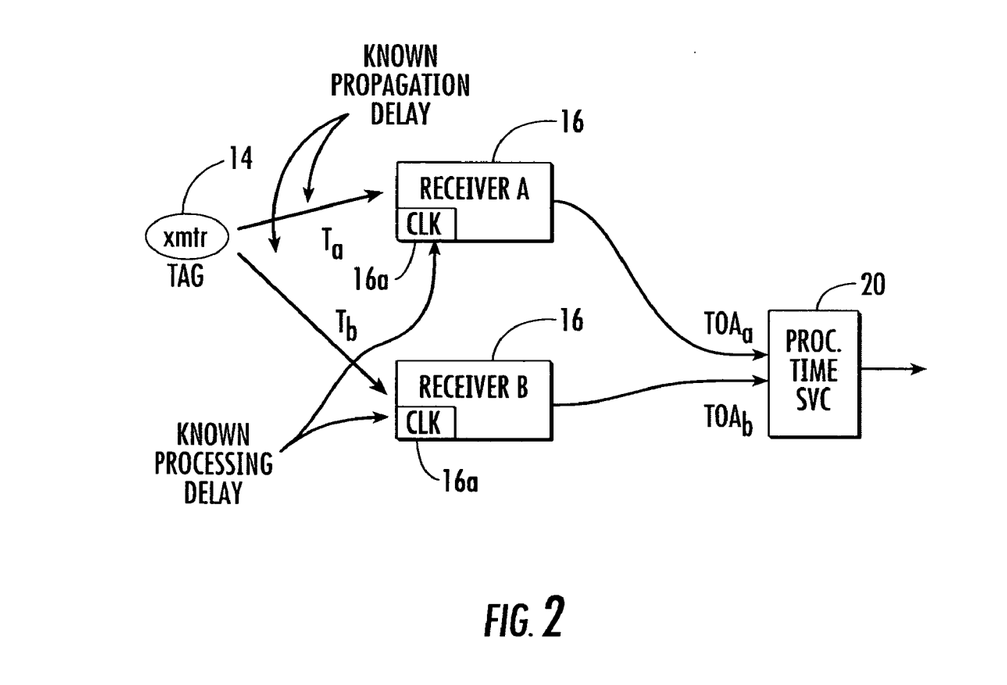
FIG. 2 is a block diagram similar to FIG. 1, but showing the time-of-arrival information that is forwarded to the processor as a time service, including the processing of a known propagation and processing delays.

FIG. 2 is another view similar to FIG. 1, but showing the implementation of this technique with details as to what parameters could be used. The tag transmitter 14, in this non-limiting example, is permanently placed in a known location, thus becoming a reference signal. Both receivers 16 time-stamp the received signal with respect to their unsynchronized local clock.

If the difference in propagation and/or processing delays are known, as illustrated, the processor operative as a time service can use the two time stamps to determine a pair of clock indications, for example, a clock A value and a clock B value corresponding to the same time. Additionally, two time-separated transmissions allow determination of differential clock rate and three transmissions indicate differential rate change. Consequently, the processor builds and maintains a model of the relationship between the two clocks.

The relationships between the receiver clocks 16a can be derived from common observations of an event, e.g., receptions of the same signal at multiple receivers. These events as signals may or may not be specially created for timing purposes.

Fundamental relationships for this description are:

$T_x$=time of signal transmission by reference (actual time; unknown)

$T_a$=propagation delay to+processing delay of receiver A (known)

$T_b$=propagation delay to+processing delay of receiver B (known)

$TOA_a$=time of arrival at receiver A (as indicated by clock A; measured)

$TOA_b$=time of arrival at receiver B (as indicated by clock B; measured)

If propagation delay is small enough, which is often the case in some applications, it is known that at time $T_x$ the clock in receiver A indicates ($TOA_a$31 $T_a$) and the clock in receiver B indicates ($TOA_b$31 $T_b$).

Relating $T_x$ to actual time requires additional information. However, relative knowledge is sufficient for the processor as a time service to determine time-of-arrival differences for other signals, i.e., to be located, if the clocks count at the same rate. By observing a second reference transmission some time later, the processor as a time service can determine the difference in clock rates between both receivers A and B.

By making N transmissions spaced in time, the time server is able to determine an $(N-1)^{st}$ order polynomial relating the two independent clocks. By making the process continuous, every transmission after first N allows the processor as a time service to update its clock relationship equation. This continually tracks the changes in the clock relationships over time.

Repetitive receptions of a signal transmitted from a known location allows the processor to determine an equation relating one receiver's indicated time (clock) to another receiver's indicated time (clock) and track changes in that relationship over time.

In some cases, it is desirable that a reference tag transmitter be at a position where the propagation delay to multiple receivers is constant and known. Typically this means the tag transmitter is located at a known location and has direct line-of-sight propagation to the receivers.

Tag transmitters can be used, however, even if their location is unknown. Fixed location tags are referred to as reference tags. One technique is to use a pair of tag transmitters with known differential propagation delay to multiple receivers. This still requires line-of-sight propagation to the receivers but removes the requirement of knowing their location. An additional benefit is that knowing the receiver processing delay is no longer required. Instead, the value can be essentially constant from receiver to receiver.

A particularly useful implementation is when the tag transmitters are co-located with the receivers. In this case, the only requirement is that propagation is reciprocal, that is, the propagation delay from the transmitter at receiver A to receiver B is the same as the propagation delay from the transmitter at receiver B to receiver A.

It is possible that the processor as a time service can operate with no fixed reference signals by exploiting over-determination. A general differential time-of-arrival (DTOA) location solution may require K observations to solve in K-1 physical dimensions. When more than K receivers detect the signal, the additional information can be used as if the transmitter were a reference signal. An over-determined location system can maintain the time service function without any signals generated specifically for system timing.

It is also possible to avoid quadratic computational complexity. For example, a system having M receivers usually maintains M*(M-1)/2 clock pair relationships, which rapidly becomes computationally prohibitive as system size grows. It is possible to avoid having the number of tracking loops, maintained by the processor as the time service, grow quadratically with the number of receivers in the system. This is accomplished by defining a system time.

Each clock can be tracked with respect to a system time. This results in a linear relationship between time service complexity and system size. System time has little meaning relative to measuring TOA differences, but has greater significance in making implementation of a time service feasible.

System time can be imaginary. It only needs to be close enough to actual time that the difference is indistinguishable over a typical signal propagation delay. One possibility is to define system time as the mean or median of all receivers' clocks. System time can also be significant because it can be made to correspond to some time standard. For example, system time can be defined to be whatever a particular receiver's clock indicates. Another example is to equate it to a local reference clock, perhaps internal to the time service's host. Alternatively, it may be tied to an external standard such as GPS. Relating receiver clocks to an arbitrary system time makes time service complexity grow only linearly with respect to system size.

Figure 3:
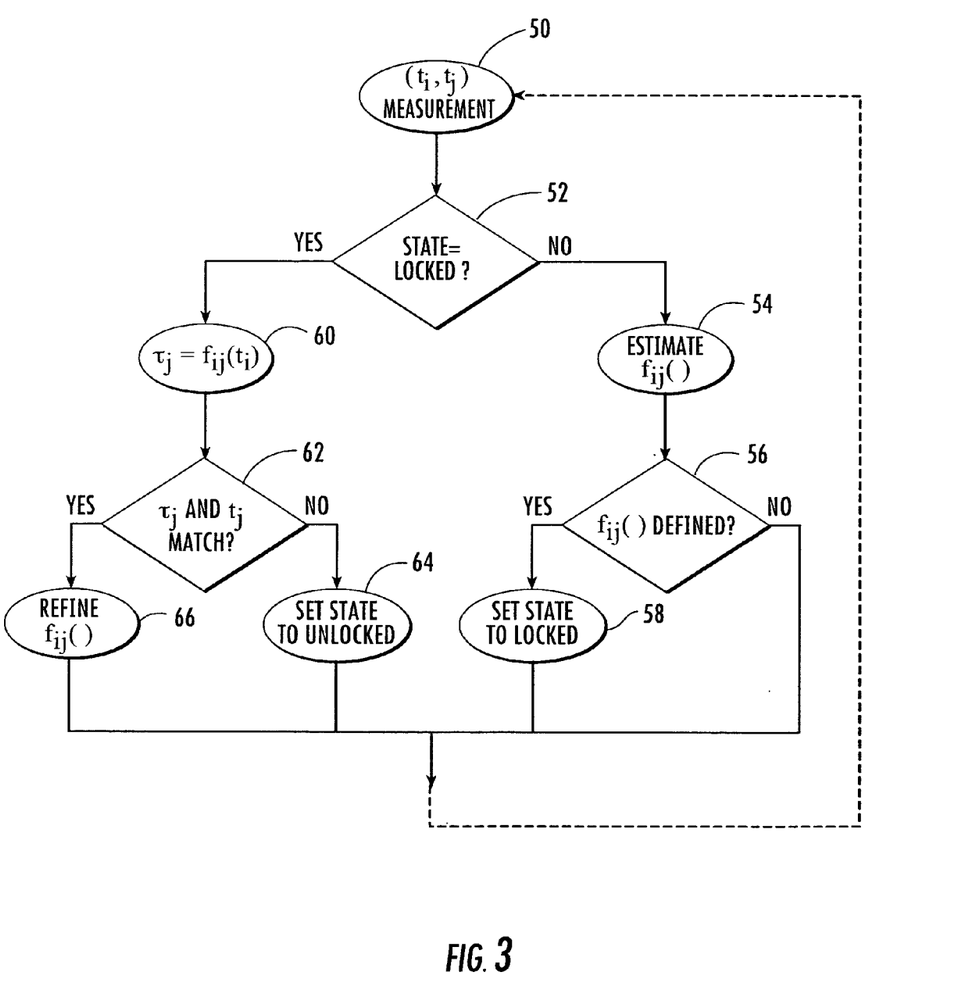
FIG. 3 is a high level flowchart showing a clock tracking loop that can be used in the present invention.

The processor as time service creates and maintains a function that describes how the clocks in two independent units are related to each other. It is a straightforward extension to relate all clocks to each other and provide the relationship between clock pairs. This can be accomplished by a clock tracking loop, such as shown in FIG. 3.

The information provided as inputs to the loop are pairs of times $(t_i, t_j)$, which imply that when the $i^{th}$ clock indicated time $t_i$ the $j^{th}$ clock indicated time $t_j$. This information comes from measuring the time-of-arrival $(toa_k)$ of a signal (generated from a known location) at both sensor i and sensor j. In this example, since the location of a tag transmitter and both sensors are known, the time required for the signal to propagate to each sensor $(p_k)$ can be determined. Thus, at the time the signal was generated, the clock in sensor i indicated time $toa_i-p_i$ and the clock in sensor j indicated time $toa_j-p_j$, producing the desired $(t_i, t_j)$ pair as $(toa_i-p_i, toa_j-p_j)$.

There is a functional relationship. For example, it is possible to assume a cubic function as an example of a clock relationship, $f_{ij}(\ )$, that is:

$$f_{ij}(t)=c_3t^3+c_2t^2+c_1t+c_0$$

The four equation coefficients, $c_k$, can be determined after four time pairs have been received. The tracking loop shown in FIG. 3 shows how these coefficients may be refined (updated) as the relationship between the individual clocks varies.

Every time a $(t_i, t_j)$ pair is measured the loop is iterated. The loop is considered to be locked if the relationship, $f_{ij}(\ )$, is defined. If not locked, the loop simply collects a number of measurements sufficient to determine the relationship. If locked, the expected value for $t_j$ (denoted as $\tau_j$ in FIG. 1) is computed. The tracking error $(t_j-\tau_j)$ is determined and compared to a threshold. If the error is overly great, the loop is considered to have become unlocked. Otherwise, the error is used to refine $f_{ij}(\ )$, that is, to track the changes in the clock relationship that occur naturally over time.

The flowchart of FIG. 3 illustrates this logic. Inputs $(t_i, t_j)$ (block 50) are input and a decision is made whether the state=locked (block 52). If not, the estimate $f_{ij}(\ )$ is made (block 54). A decision is made whether $f_{ij}(\ )$ is defined (block 56). If not, the loop returns. If yes, the state is set to lock (block 58) and the loop could then later repeat. If at block 52 the state is located, $T_j=f_{ij}(t_i)$ (block 60), a decision is made whether $\tau_j$ and $t_j$ match (block 62). If not, the state is set to an unlocked position (block 64). If yes, refine $f_{ij}(\ )$ (block 66).

Figure 4:
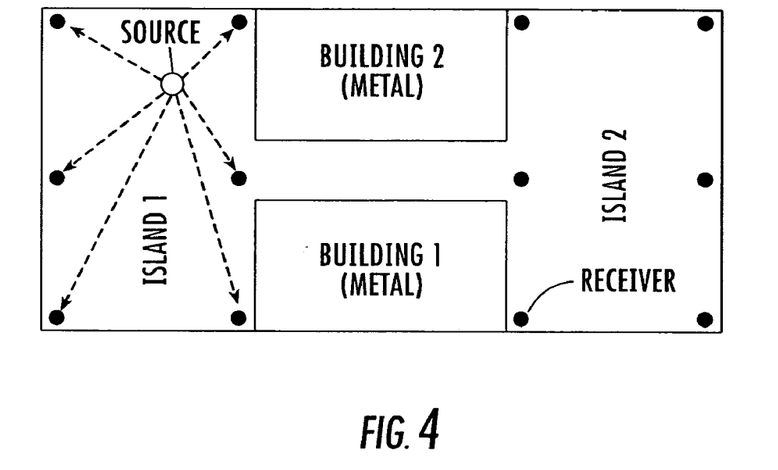
FIG. 4 is an example of a location system having a network that is partitioned by two buildings into two networks or islands.

It is also possible to achieve time synchronized network performance with receivers that are positioned such that some form a loosely connected network, for example, as shown in FIG. 4.

The system and method of the present invention can achieve useful characteristics of a time-synchronized system using nodes, e.g., receivers or signal readers, which are unsynchronized, e.g., include unsynchronized clocks, when at least part of the network is loosely connected to another part of the network. For example, a plurality of receivers are positioned in the monitored environment and arranged in a plurality of receiver networks, for example, the two illustrated networks in FIGS. 4 and 5. Receivers in each network are tightly coupled to each other allowing a timing signal that is received by receivers in one network not to be received in the other loosely coupled network.

A large network formed of receivers 16 such as those receivers illustrated in FIG. 2 could appear as "sets" of tightly connected nodes. For example, nodes or receivers are tightly connected if a timing signal received by one node, or receiver, is likely to be received by each of the other receivers. Nodes or receivers could be considered to be loosely connected if most of the timing signals received by one receiver or node cannot be received by the other receiver or node.

FIG. 4 illustrates two groups of tightly connected nodes 16 that are loosely connected to each other because of the presence of two metal buildings 70, 72, which divide a first or left parking lot 74 as an Island or network 1, and a second or right parking lot 76 as an Island or network 2. Any source, for example, a tag transmitter located in the left parking lot 74 (Island 1) will be received by the six receivers 16 in that island but will not be received by any of the six receivers 16 in the right parking lot 76 (Island 2) because of signal blockage from the metal buildings 70, 72.

The processing and time service technique described previously may have some operational difficulty with loosely connected networks. The system tends to form two independent "islands" or networks that compete with each other. The loose connection between these islands results in excessive tracking errors for one island or the other.

This problem can be addressed in accordance with the present invention by weighing the timing links in a fashion that is derived from the network topography. This makes loosely connected nodes respond more aggressively to the signals to form loose connections.

It should be recognized that the system separates itself into "islands" or networks, which individually are stable. The processor as a time service can treat each island as an independent network and avoid the apparent competition between the islands. The processor defines an "island" or network time for each island or network and tracks the relationship between each receiver clock and the corresponding island or network time. This could result in uncontrolled inter-island time discontinuities, which could be unacceptable in some instances.

Figure 5:
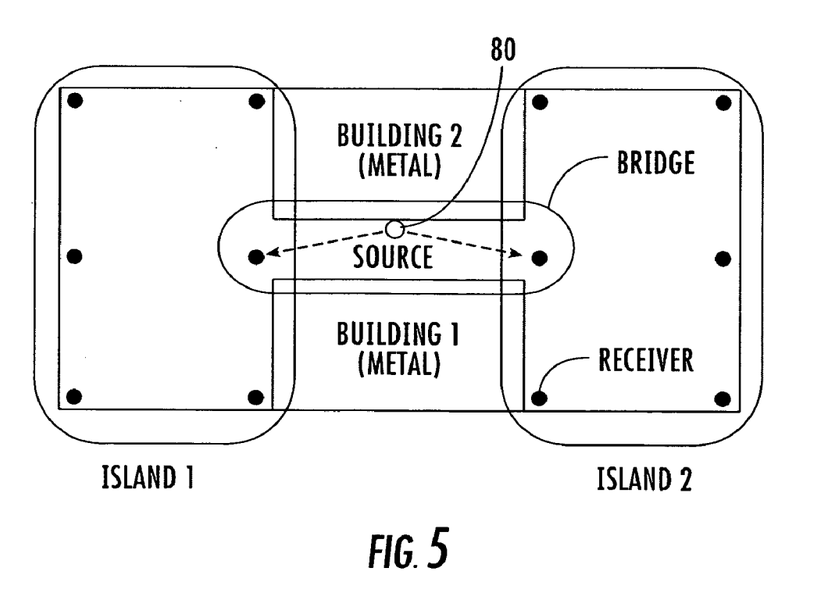
FIG. 5 is a block diagram similar to FIG. 3, but showing the two independent time networks or islands connected by a time bridge.

Because the system includes network nodes as islands, not just individual receivers, these time discontinuities can be eliminated. A system-level time service treats islands as its basic unit and tracks the relationship between the island or network times of each. As described previously, the system independently defines a "system time" and tracks its relationship to each island or network time. The timing signals used to determine these relationships form network bridges that connect islands or networks to each other. A network bridge must include at least one node 80, for example, a tag transmitter, from each network or island it is connecting as shown in FIG. 5.

Tightly connected sets of receivers that form networks and are loosely connected to other receivers, for example, another network, are best accommodated by a processor as a time service that treats these sets as independent islands, each with their own time reference. A higher, system-level service uses the network bridges to track the relationship between each network or island's time and the global system time.

It is evident that the system and method of the present invention provides a useful system and method for relating time between sets of nodes as receivers that are loosely connected to each other. It is possible to use a tiered time service. The lower level treats each tightly connected set of nodes as an independent system, for example, called a network or island. The higher level relates the networks or islands to each other, using normal timing concepts applied to network bridge links. Although the description concerned a two-level time service, it should be clear that the invention extends to an arbitrary number of levels or tiers.

Figure 6:
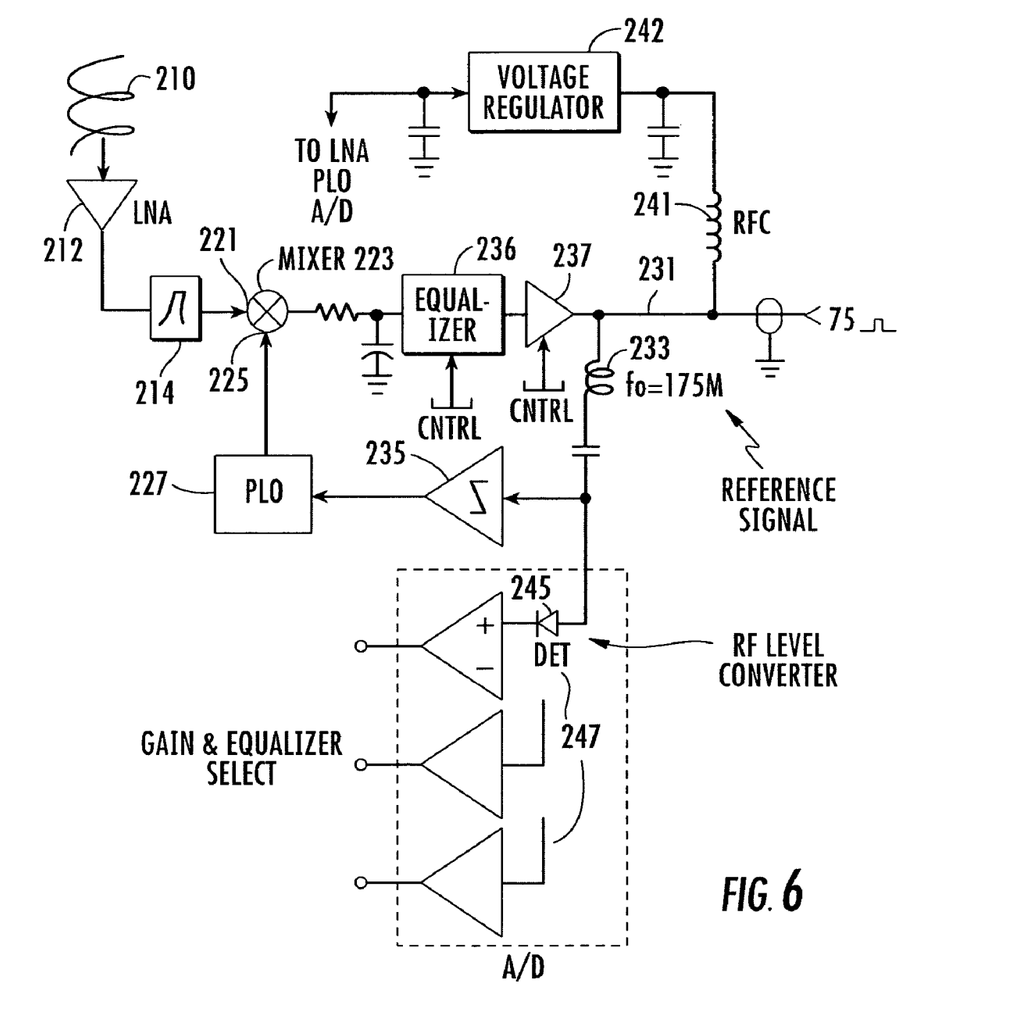
FIG. 6 is a block diagram of one example of a circuit architecture that can be modified for use as a receiver of the present invention.
Figure 7:
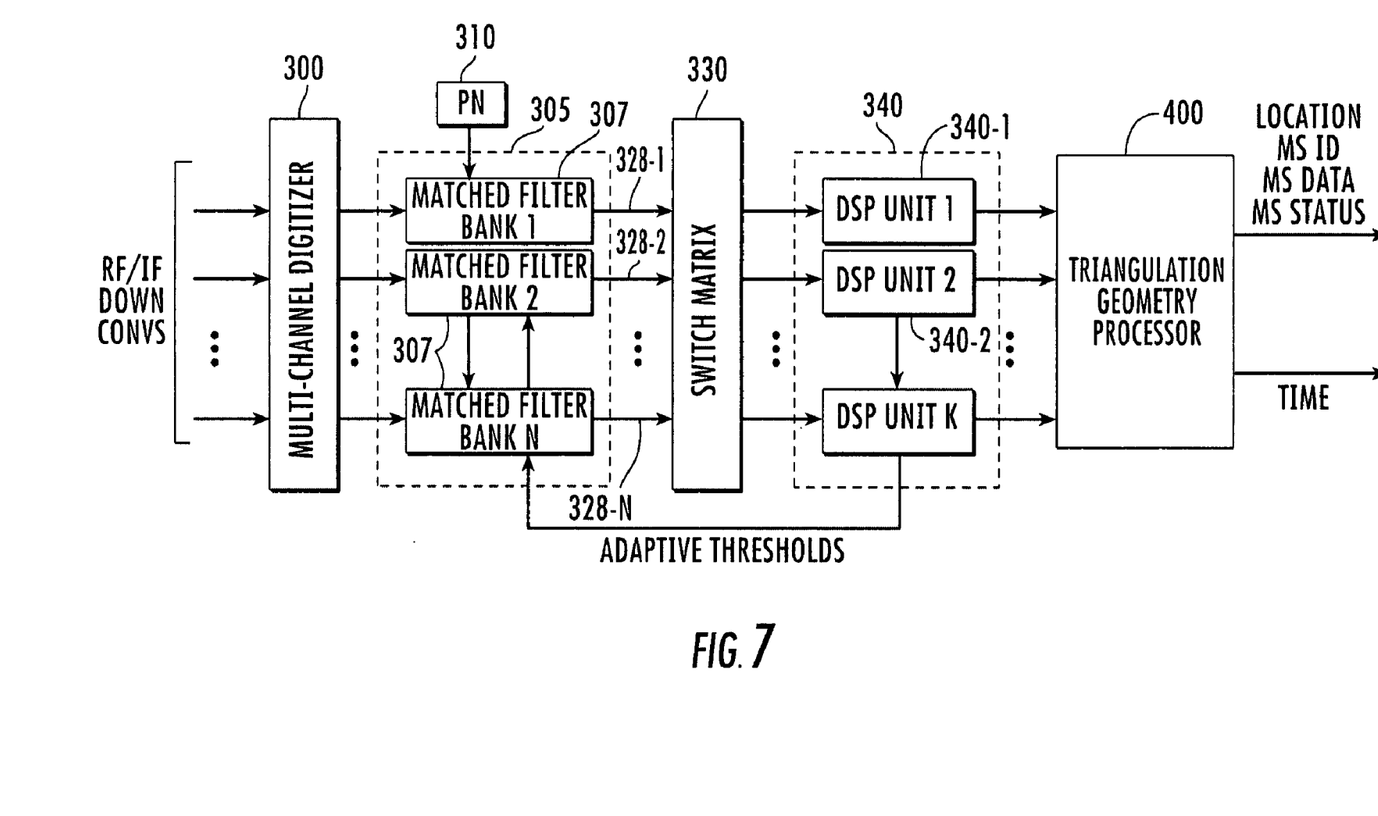
FIG. 7 is a high level block diagram of one example of the circuit architecture that can be used within the processor for the correlation based, RF signal processing.

FIGS. 6 and 7 represent examples of the type of circuits that can be used with modifications as suggested by those skilled in the art for tag signal reader or receiver 16 circuitry and a processor 20 circuitry to determine any timing marker, set up a correlation algorithm responsive to any timing marker or other RF signal, determine which tag signals are first-to-arrive signals, and conduct differentiation of first-to-arrive signals to locate a tag or other transmitter generating a tag or comparable signal. It should be understood that the processor could be formed as separate circuits, for example, for different functions. Other details of representative circuits that could be used with various modifications suggested by those skilled in the art are shown in the above-identified and incorporated by reference patents. The processor circuitry would include other circuitry for determining clock timing indications for each clock at a respective receiver.

Referring now to FIGS. 6 and 7, a representative circuit and algorithm as described in the above mentioned and incorporated by reference patents are disclosed and set forth in the description below to aid in understanding the type of tag signal reader and processor circuitry that can be used for determining which signals are first-to-arrive signals and how the processor conducts differentiation of the first-to-arrive signals to locate a tag transmitter. These circuits can be modified for use with the invention as described above.

FIG. 6 diagrammatically illustrates one non-limiting example of the circuitry configuration of a respective architecture for "reading" associated signals or a pulse (a "blink") used for location determination signals, such as signals emitted from a tag transmitter to the tag signal readers as receivers. This circuit can be associated and modified for use with the receiver of the present invention. An antenna 210 senses appended transmission bursts or other signals from the tag transmitter and associated object to be located. The antenna in this aspect of the invention could be omni-directional and circularly polarized, as noted before, and coupled to a power amplifier 212, whose output is filtered by a bandpass filter 214. Naturally, dual diversity antennae could be used as noted in some of the incorporated by reference patents or a single antenna, as also noted in some of the patents. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor as described before. The communication cable 231 also supplies DC power for the various components of the tag signal reader by way of an RF choke 241 to a voltage regulator 242, which supplies the requisite DC voltage for powering an oscillator, power amplifier and analog-to-digital units of the receiver.

A 175 MHz reference frequency can be supplied by a communications control processor to the phase locked local oscillator 227 and its amplitude could imply the length of any communication cable 231 (if used). This magnitude information can be used as control inputs to equalizer 236 and current amplifier 237, so as to set gain and/or a desired value of equalization, that may be required to accommodate any length of any communication cables (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

It is possible that sometimes signals could be generated through the clocks used with the global positioning system receivers and/or other wireless signals. Such timing reference signals can be used as suggested by known skilled in the art.

FIG. 7 diagrammatically illustrates an example of the architecture of a correlation-based, RF signal processor circuit as part of a location processor to which the output of a respective RF/IF conversion circuit of FIG. 6 can be coupled such as by wireless communication (or wired in some instances) for processing the output and determining location based on the information from various tag signal readers. This receiver data could also be GPS based because receivers are fixed at fixed, known locations using GPS coordinates. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse.

Because each tag signal reader can possibly receive multiple signals from the tag transmitter due to multipath effects caused by the signal transmitted by the tag transmitter being reflected off various objects/surfaces, the correlation scheme ensures identification of the first observable transmission, which is the only signal containing valid timing information from which a true determination can be made of the distance.

For this purpose, as shown in FIG. 7, in this non-limiting example, the RF processor can use a front end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive analog-to-digital converters that are capable of directly sampling very high IF frequencies and large bandwidths. Implementing a bandpass filtering approach typically requires a second ASIC to provide an interface between the analog-to-digital converters and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by a PN spreading sequence generator of a tag transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4\times10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required.

A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

In this non-limiting example, the processor section 400 could use a standard multi-lateration algorithm that relies upon time-of-arrival inputs from at least three readers to compute the location of the tag transmitter. The algorithm may be one which uses a weighted average of the received signals. In addition to using the first observable signals to determine object location, the processor also can read any data read out of a memory for the tag transmitter and superimposed on the transmission. Object position and parameter data can be downloaded to a database where object information is maintained. Any data stored in a tag memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multipath effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor 20 could be modified to include a front end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor 20 could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of processors. The partitioned processors are coupled in turn through distributed association processors to multiple location processors. For tag detection capability, each reader could be equipped with a low cost omni-directional antenna, that provides hemispherical coverage within the monitored environment.

A detection processor filters received energy to determine the earliest time-of-arrival energy received for a transmission, and thereby minimize multipath effects on the eventually determined location of a tag transmitter. The detection processor demodulates and time stamps all received energy that is correlated to known spreading codes of the transmission, so as to associate a received location pulse with only one tag transmitter. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor. Other circuits included and explained in the above-identified and incorporated by reference patents and published patent applications can be modified and used in accordance with the present invention.

This application is related to copending patent application entitled, "LOCATION SYSTEM AND METHOD THAT ACHIEVES TIME SYNCHRONIZED NETWORK PERFORMANCE WITH NODES DIVIDED INTO SEPARATE NETWORKS," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for locating an object within a monitored environment comprising:
   a tag transmitter that transmits an RF signal and associated with an object;
   a plurality of receivers within the monitored environment for receiving the RF signal from the tag transmitter, said receivers having unsynchronized clocks;
   a processor operative with each receiver for determining clock timing relationships for the clocks based on one of at least the propagation or processing delays in the receivers for synchronizing receiver performance, wherein said processor is operative for conducting differentiation of the time of arrival signals received from a tag transmitter to locate an object associated with the tag transmitter.

2. A system according to claim 1, wherein said tag transmitter is positioned at a fixed location.

3. A system according to claim 1, and further comprising a pair of tag transmitters which transmit RF signals to receivers with known propagation delay.

4. A system according to claim 1, wherein the processing delay within each receiver is substantially constant with each other.

5. A system according to claim 1, wherein the processor is operative for processing two time separated signals for determining a differential clock rate.

6. A system according to claim 5, wherein the processor is operative for processing three time separated signals to indicate differential rate change.

7. A system according to claim 6, wherein the processor is operative for maintaining a model of timing relationships of clocks at the receivers.

8. A system according to claim 1, wherein said receivers are positioned at known locations.

9. A system according to claim 1, wherein said RF signal transmitted from a tag transmitter includes data indentifying an object associated with the tag transmitter.

10. A system according to claim 1, wherein said RF signal further comprises a pseudo random spread spectrum RF signal.

11. A system according to claim 1, wherein said processor is operative to relate the clocks of each receiver to a system time.

12. A system according to claim 1, wherein said processor is operative for forming a tracking loop to track clock relationships that occur naturally over time.

13. A system according to claim 1, which further comprises determining an equation relating the indicated time of one clock at a respective receiver to another receiver clock and tracking changes in that relationship over time.

14. A system for time synchronizing a network comprising:
   a tag transmitter positioned at a known location that transmits an RF signal;
   a plurality of receivers operative as network nodes for receiving the RF signal from the tag transmitter, said receivers having unsynchronized clocks;
   a processor operative with each receiver for determining clock timing relationships for the clocks at a receiver based on one of at least the propagation or processing delays in the receivers for synchronizing receiver performance.

15. A system according to claim 14, wherein said tag transmitter is positioned at a fixed location.

16. A system according to claim 14, and further comprising a pair of tag transmitters which transmit RF signals to receivers with known propagation delay.

17. A system according to claim 14, wherein the processing delay within each receiver is substantially constant with each other.

18. A system according to claim 14, wherein the processor is operative for processing two time separated signals for determining a differential clock rate.

19. A system according to claim 18, wherein the processor is operative for processing three time separated signals to indicate differential rate change.

20. A system according to claim 19, wherein the processor is operative for maintaining a model of timing relationships of clocks at the receivers.

21. A system according to claim 14, wherein said receivers are positioned at known locations.

22. A system according to claim 14, wherein said RF signal transmitted from a tag transmitter includes data indentifying an object to be located and associated with the tag transmitter.

23. A system according to claim 14, wherein said RF signal further comprises a pseudo random spread spectrum RF signal.

24. A system according to claim 14, wherein said processor is operative to relate the clocks of each receiver to a system time.

25. A system according to claim 14, wherein said processor is operative for forming a tracking loop to track clock relationships that occur naturally over time.

26. A system according to claim 14, which further comprises determining an equation relating the indicated time of one clock at a respective receiver to another receiver clock and tracking changes in that relationship over time.

27. A method for locating an object within a monitored environment, which comprises:
 transmitting an RF signal from a tag transmitter associated with an object to be located;
 receiving the RF signal at a plurality of receivers having unsynchronized clocks and positioned within the monitored environment;
 transmitting to a processor the time of arrival of the received RF signals based on the unsynchronized clock time at each respective receiver;
 determining clock timing relationships for the clocks based on one of at least the propagation or processing delays in the receivers for synchronizing receiver performance; and
 conducting differentiation of the time of arrival signals received from the tag transmitter to locate an object associated with the tag transmitter.

28. A method according to claim 27, which further comprises transmitting RF signals from a tag positioned at fixed location.

29. A method according to claim 27, which further comprises transmitting RF signals from a pair of tag transmitters to a receiver with known propagation delay.

30. A method according to claim 27, wherein the processing delay within each receiver is substantially constant with each other.

31. A method according to claim 27, which further comprises receiving two time separated signals for determining differential clock rate.

32. A method according to claim 31, which further comprises receiving three time separated signals to indicate differential rate change.

33. A method according to claim 32, which further comprises maintaining a model of timing relationships of clocks at the receivers.

34. A method according to claim 27, which further comprises positioning the receivers at known locations.

35. A method according to claim 27, which further comprises transmitting an RF signal from the tag transmitter having data indentifying the object to which the tag is associated.

36. A method according to claim 27, which further comprises transmitting a pseudo random spread spectrum RF signal from the at least one tag.

37. A method according to claim 27, which further comprises processing first-to-arrive RF signals at each receiver.

38. A method according to claim 27, which further comprises forming a tracking loop to track clock relationships that occur naturally over time.

39. A method according to claim 27, which further comprises determining an equation relating the indicated time of one clock at a respective receiver to another clock at another receiver and tracking changes in that relationship over time.

40. A method for time synchronizing a network which comprises:
 transmitting an RF signal from a tag transmitter positioned at a known location;
 receiving the RF signal at a plurality of receivers operative as network nodes and having unsynchronized clocks;
 transmitting to a processor the time of arrival of any received RF signal based on an unsynchronized clock time; and
 determining clock timing relationships for the clocks based on one of at least the propagation or processing delays in the receivers for synchronizing receiver performance.

41. A method according to claim 40, which further comprises transmitting RF signals from a pair of tag transmitters to receivers with known propagation delay.

42. A method according to claim 40, wherein the processing delay within each receiver is substantially constant with each other.

43. A method according to claim 40, which further comprises receiving two time separated signals for determining differential clock rate.

44. A method according to claim 43, which further comprises receiving three time separated signals to indicate differential rate change.

45. A method according to claim 44, which further comprises maintaining a model of timing relationships of clocks at the receivers.

46. A method according to claim 40, which further comprises positioning the receivers at known locations.

47. A method according to claim 40, which further comprises associating a tag with an object to be located.

48. A method according to claim 40, which further comprises transmitting an RF signal from the at least one tag having data indentifying the object to which the tag is associated.

49. A method according to claim 40, which further comprises transmitting a pseudo random spread spectrum RF signal from the at least one tag.

50. A method according to claim 40, which further comprises processing first-to-arrive RF signals at each receiver.

51. A method according to claim 40, which further comprises forming a tracking loop to track clock relationships that occur naturally over time.

52. A method according to claim 40, which further comprises determining an equation relating the indicated time of one clock at a respective receiver to another clock at another receiver and tracking changes in that relationship over time.

* * * * *

UNITED STATES PATENT AND TRADEMARK OFFICE
CERTIFICATE OF CORRECTION

PATENT NO. : 7,190,271 B2  
APPLICATION NO. : 10/980855  
DATED : March 13, 2007  
INVENTOR(S) : Boyd Page 1 of 2

It is certified that error appears in the above-identified patent and that said Letters Patent is hereby corrected as shown below:

| | |
|---|---|
| Column 4, Lines 42-43 | Delete: "transmits wideband"<br>Insert: --transmits a wideband-- |
| Column 6, Line 11 | Delete: "$(TOA_a 31\ T_a)$"<br>Insert: --$(TOA_a - T_a)$-- |
| Column 6, Line 12 | Delete: "$(TOA_b 31\ T_b)$"<br>Insert: --$(TOA_b - T_b)$-- |
| Column 7, Line 64 | Delete: "$f_{ij}(\ )$"<br>Insert: --$f_{ij}(\ )$-- |
| Column 7, Line 67 | Delete: "$T_j = f_{ij}(t_i)$"<br>Insert: --$\tau_j = f_{ij}(t_i)$-- |
| Column 10, Lines 39-40 | Delete: "suggested by known skilled in the art"<br>Insert: --known to those skilled in the art-- |
| Column 14, Line 14 | Delete: "indentifying"<br>Insert: --identifying-- |
| Column 14, Line 63 | Delete: "indentifying"<br>Insert: --identifying-- |
| Column 15, Lines 29-30 | Delete: "at fixed"<br>Insert: --at a fixed-- |
| Column 15, Line 50 | Delete: "indentifying"<br>Insert: --identifying-- |

UNITED STATES PATENT AND TRADEMARK OFFICE
CERTIFICATE OF CORRECTION

PATENT NO. : 7,190,271 B2
APPLICATION NO. : 10/980855
DATED : March 13, 2007
INVENTOR(S) : Boyd It is certified that error appears in the above-identified patent and that said Letters Patent is hereby corrected as shown below:

Column 16, Line 42      Delete: "indentifying"
                        Insert: --identifying--

Signed and Sealed this

Seventh Day of August, 2007

JON W. DUDAS
*Director of the United States Patent and Trademark Office*